(12) United States Patent
Duerr et al.

(10) Patent No.: US 12,055,463 B2
(45) Date of Patent: Aug. 6, 2024

(54) MELTABLE FLUORESCENT DYE FOR LEAK DETECTION

(71) Applicant: Spectronics Corporation, Melville, NY (US)

(72) Inventors: John Duerr, Massapequa Park, NY (US); Limin Chen, Dix Hills, NY (US)

(73) Assignee: Spectronics Corporation, Melville, NY (US)

( * ) Notice: Subject to any disclaimer, the term of this patent is extended or adjusted under 35 U.S.C. 154(b) by 1036 days.

(21) Appl. No.: 16/986,638

(22) Filed: Aug. 6, 2020

(65) Prior Publication Data

US 2021/0041322 A1 Feb. 11, 2021

Related U.S. Application Data

(60) Provisional application No. 62/883,711, filed on Aug. 7, 2019.

(51) Int. Cl.
| | | |
|---|---|---|
| *G01M 3/22* | (2006.01) | |
| *C09B 57/08* | (2006.01) | |
| *C09B 67/02* | (2006.01) | |
| *C09B 67/42* | (2006.01) | |
| *G01N 21/64* | (2006.01) | |

(52) U.S. Cl.
CPC ............... *G01M 3/22* (2013.01); *C09B 57/08* (2013.01); *C09B 67/0092* (2013.01); *C09B 67/0097* (2013.01); *G01N 21/6428* (2013.01); *G01N 2021/6439* (2013.01)

(58) Field of Classification Search
CPC ...................................................... G01M 3/22
See application file for complete search history.

(56) References Cited

U.S. PATENT DOCUMENTS

| | | | |
|---|---|---|---|
| 4,663,358 A | 5/1987 | Hyon et al. | |
| 5,167,140 A | 12/1992 | Cooper et al. | |
| 5,650,563 A | 7/1997 | Cooper et al. | |
| 6,469,300 B1 * | 10/2002 | Trigiani | B60H 1/00585 73/40.7 |
| 7,251,984 B2 | 8/2007 | Duerr et al. | |
| 7,552,623 B2 | 6/2009 | Cooper et al. | |
| 9,845,390 B1 | 12/2017 | Tyson | |
| 2018/0292288 A1 | 10/2018 | Cooper et al. | |

* cited by examiner

*Primary Examiner* — Kevin Joyner
(74) *Attorney, Agent, or Firm* — Faegre Drinker Biddle & Reath LLP

(57) ABSTRACT

A process for applying a fluorescent leak detection dye to a component of an air conditioning system. The process involves the steps of (i) providing a fluorescent dye that is solid at room temperature, (ii) exposing the dye to an elevated temperature to melt the dye into a liquid or flowable state, (iii) injecting, channeling, spraying or placing the flowable dye into or on a component or an HVAC or A/C system, (iv) allowing the dye to resolidify in or on the component, (v) attaching the component to the HVAC or A/C system, and (iv) dissolving the resolidified dye in a liquid/gas.

11 Claims, 4 Drawing Sheets

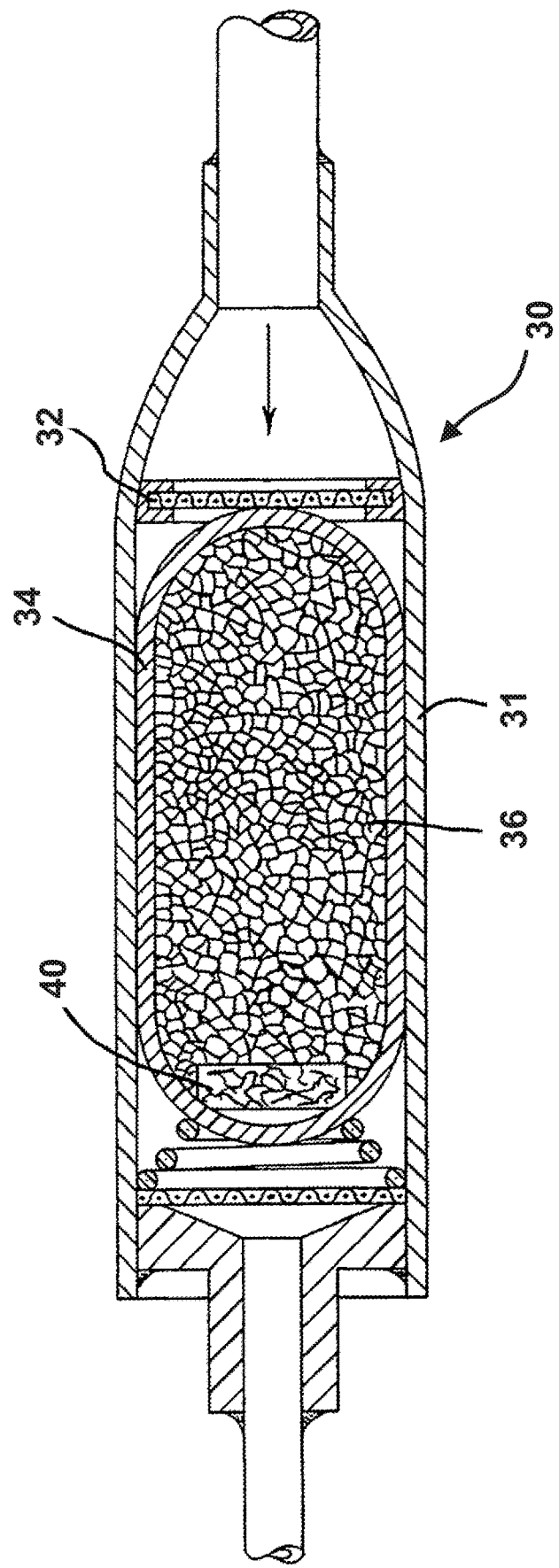

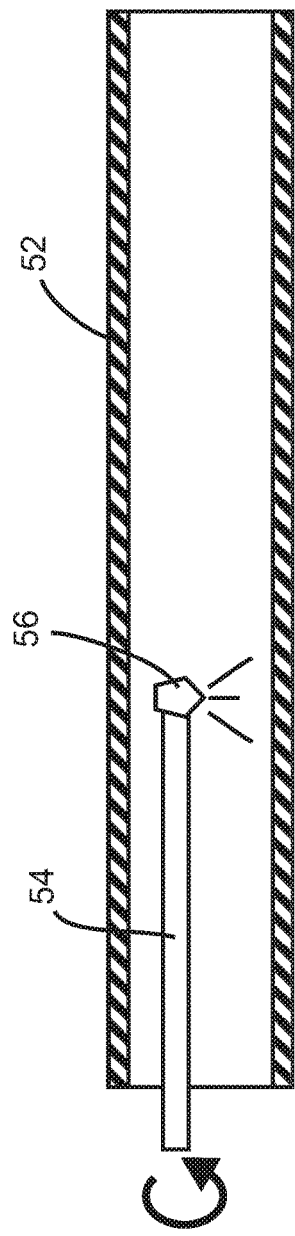
FIG. 4A
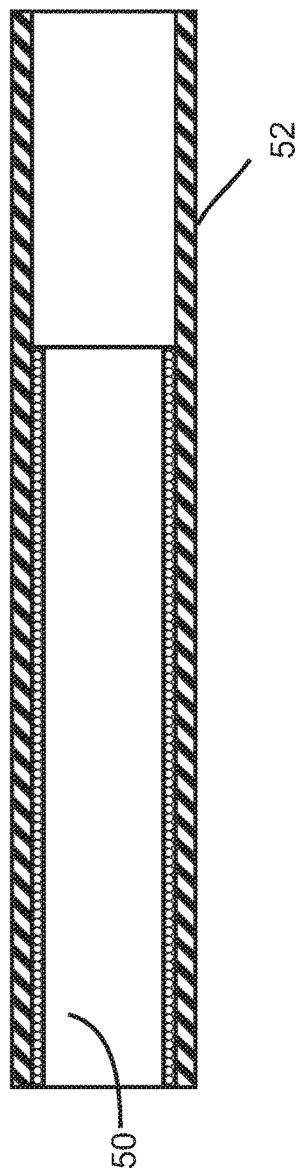
FIG. 4B
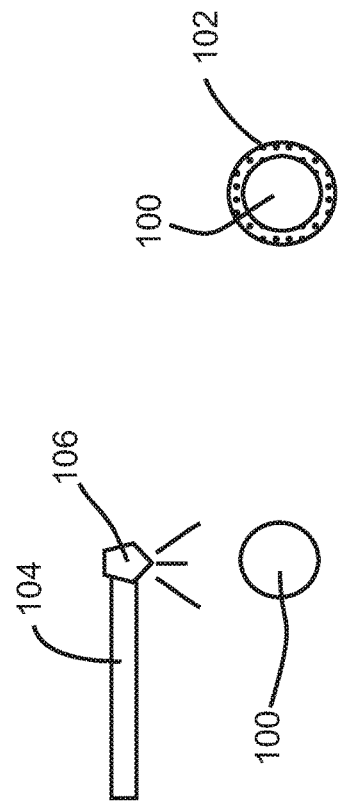
FIG. 5A
FIG. 5B

MELTABLE FLUORESCENT DYE FOR LEAK DETECTION

RELATED APPLICATION

This application is related to and claims priority from U.S. Provisional Application No. 62/883,711, filed Aug. 7, 2019, the disclosure of which is incorporated herein by reference in its entirety.

BACKGROUND

Conventional fluorescent leak detection systems used in commercial, industrial, automotive and domestic HVAC or A/C systems utilize either (i) a liquid dye that is added to refrigerant in the HVAC or A/C system, (ii) a dry dye loaded on a wafer that is introduced into a component of the HVAC or A/C system, or (iii) a pellet added to a component in the A/C system in a solid form. Examples of these prior art systems are disclosed in, for example, U.S. Pat. Nos. 5,167,140; 5,650,563; 7,251,984; and 7,552,623, the disclosures of which are incorporated herein by reference in their entireties. In the dry dye or pellet embodiments, the dye is configured to dissolve into the refrigerant or oil within the refrigerant as the refrigerant flows through the component encasing the dye.

Thus, in the prior leak detection methods the dye is introduced into the A/C system in either (i) a liquid form and remains in that state (albeit mixed with the refrigerant/oil), or (ii) a dry dye on a wafer or a pellet which dissolves into a liquid form and remains in that state (albeit mixed with the refrigerant). The current liquid system requires the OEM to introduce the liquid into the system after the system is assembled. This adds time to the manufacturing process. In addition, use of liquids can lead to spills. The dry-wafer technology eliminates the concern about spilling, but requires the use of a wafer carrier which must be inert in the system since the wafers do not dissolve but, instead, remain in the system after the dye dissolves into the refrigerant. In addition, the wafer is an added cost in the system which adds no value once the dye it held has washed out. Furthermore, the current wafer-dye system requires 10-15 minutes for the dye to dissolve into the refrigerant which delays inspect times at OEMs.

SUMMARY OF THE INVENTION

An object of the present invention is to provide a process for applying a fluorescent leak detection dye to a component of an air conditioning system. The process involves (i) providing a fluorescent dye that is solid at room temperature; (ii) exposing the dye to an elevated temperature to melt the dye into a flowable state so as to produce a flowable dye; (iii) injecting, channeling, spraying or placing the flowable dye into or on a component or an HVAC or A/C system; and (iv) allowing the dye to resolidify in or on the component.

Preferably the process also involves (v) attaching the component with the resolidified dye to the HVAC or A/C system; and (iv) exposing the resolidified dye to a liquid/gas to cause the resolidified dye to dissolve.

In one embodiment, the step of exposing the resolidified dye to a liquid/gas involves allowing the resolidified dye to change to a liquid state and dissolving the liquid dye into the liquid/gas.

In an embodiment, the component is a plurality of desiccant beads for a desiccant bag in a receiver-dehydrator and wherein the step of injecting, channeling, spraying or placing the flowable dye involves spraying or dispensing a flow of the liquefied dye onto the desiccant beads to form coated desiccant beads, and wherein after the step of allowing the dye to resolidify the process involves the step of adding the plurality of coated desiccant beads to the desiccant bag and attaching the desiccant bag to the receiver-dehydrator.

Preferably prior to the step of spraying or dispensing a flow of the liquefied dye onto the desiccant beads the process involves placing a plurality of desiccant beads in a tray, and channeling the liquefied dye to a spray head to dispense a volume of the liquefied dye onto the beads as that beads are tumbled in the tray.

In an embodiment, the component is a hose for an air conditioning system, and where the step of injecting, channeling, spraying or placing the flowable dye involves spraying or dispensing a flow of the flowable dye into the inside of the hose to form a coating.

Preferably after the step of allowing the dye to resolidfy the process involves the step of attaching the hose with the coating to the air conditioning system.

In an embodiment, the component is a condenser for an air conditioning system, and the step of injecting, channeling, spraying or placing the flowable dye involves spraying or dispensing a flow of the flowable dye into a port on the condenser, and after the step of allowing the dye to resolidfy the process involves the step of attaching the condenser with the coating to the air conditioning system.

In an embodiment, the component is a receiver-dehydrator for an air conditioning system, and the step of injecting, channeling, spraying or placing the flowable dye involves spraying or dispensing a flow of the flowable dye into a port on the receiver-dehydrator, and after the step of allowing the dye to resolidfy the process involves the step of attaching the receiver-dehydrator with the resolidified dye to the air conditioning system.

In an embodiment, the component is a thermostatic expansion valve for an air conditioning system, and the step of injecting, channeling, spraying or placing the flowable dye involves injecting, channeling, spraying or placing a flow of the flowable dye into an inlet or outlet of the thermostatic expansion valve, and after the step of allowing the dye to resolidfy the process involves the step of attaching the thermostatic expansion valve with the resolidified dye to the air conditioning system.

Preferably the process involves packaging a plurality of the components that include the resolidified dye; and shipping the packaged components to a manufacturer for assembly in HVAC or A/C systems.

The foregoing and other features of the invention and advantages of the present invention will become more apparent in light of the following detailed description of the preferred embodiments, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of the illustrating the invention, the drawings show a form of the invention which is presently preferred. However, it should be understood that this invention is not limited to the precise arrangements and instrumentalities shown in the drawings.

FIG. 3 is an enlarged schematic cross-section of a prior art placement of a wafer in a desiccant bag in an automobile air conditioning system of FIG. 1.

FIGS. 4A and 4B are schematics depict application of a meltable dye according to the present invention on a component of an air conditioning system of FIG. 1.

FIGS. 5A and 5B are schematics depicting application of a meltable dye according to the present invention on a desiccant bead of a receiver-dehydrator in an air conditioning system of FIG. 1.

DETAILED DESCRIPTION OF THE EMBODIMENTS

Figure 1:
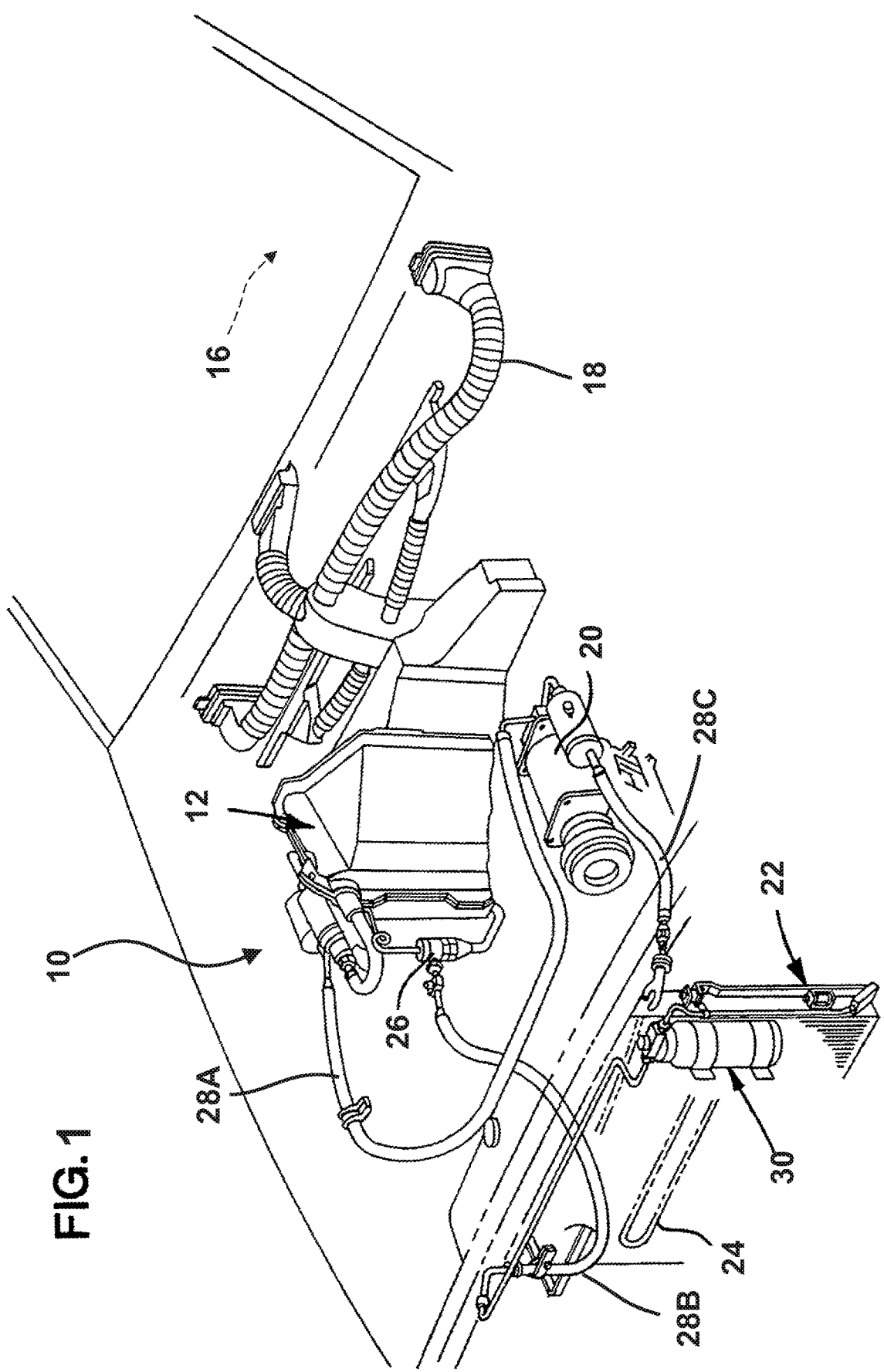
FIG. 1 is a perspective view of an automobile air conditioner system depicting the major components as installed in a conventional automobile.
Figure 2:
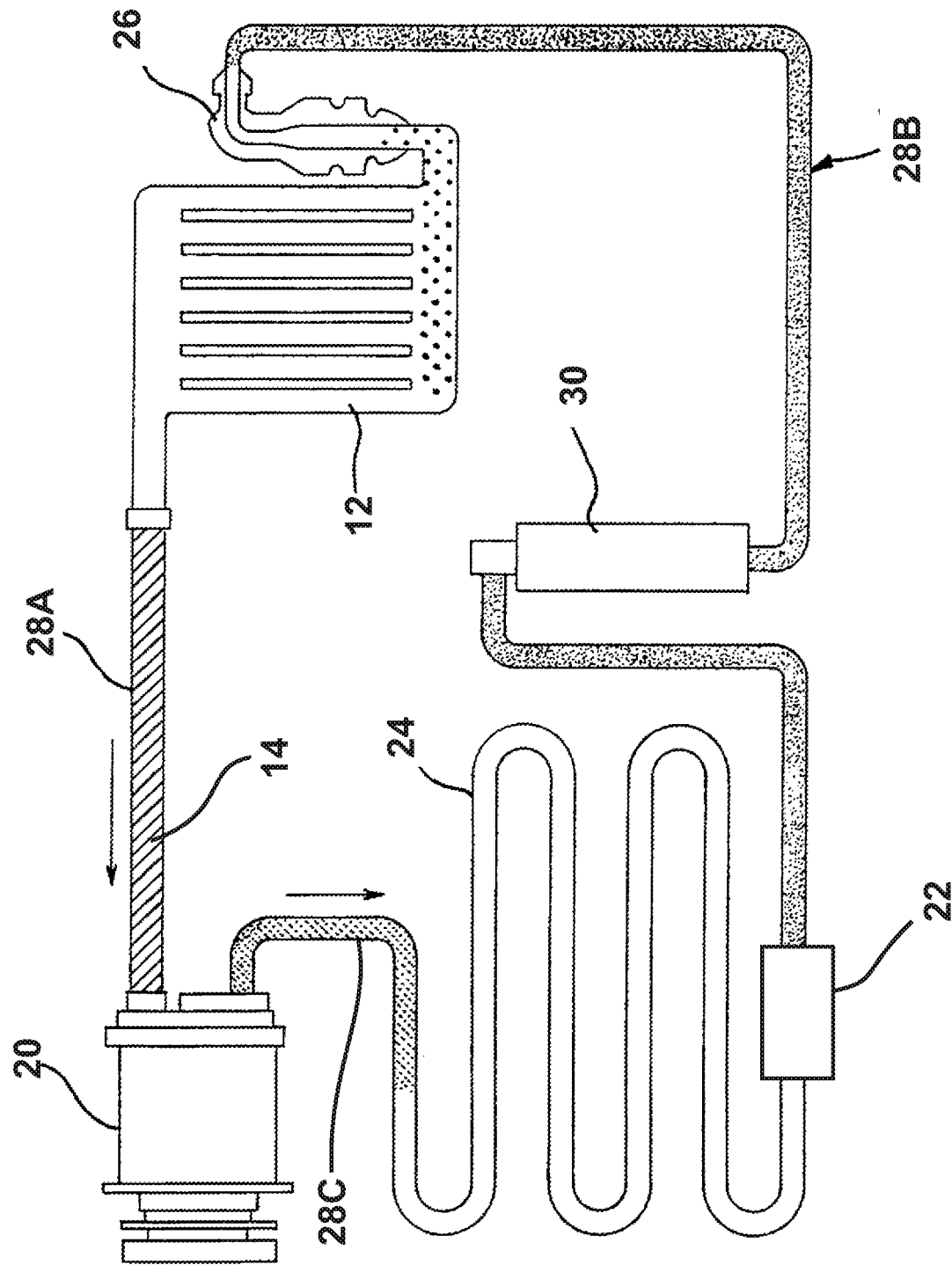
FIG. 2 is a schematic illustration of a basic refrigeration system for an automobile air conditioner of FIG. 1, with a receiver-dehydrator located between the condenser and evaporator.

Referring to the drawings in detail, wherein like numerals indicate like elements, FIGS. 1 and 2 illustrate various components of an air conditioning refrigeration system 10 according to the present invention. The system 10 includes an evaporator unit 12 where subcooled liquid refrigerant 14 enters and is allowed to expand and absorb heat from warm air of the passenger compartment, causing the refrigerant to vaporize. The warm air of the passenger compartment 16 is connected to the evaporator 12 via ducting 18, such that the cooled and dried air is recirculated into the passenger compartment 16. After absorbing heat from the passenger compartment 16, the refrigerant gas is drawn from the evaporator 12 by suction into a compressor 20, which compresses the gas, thereby raising its pressure and temperature. The high-pressure hot vapor is passed through a condenser 22, in which the vapor is exposed to a large cooling-surface area by flowing through a labyrinth of finned-coils 24 over which outside air is rapidly blown to transport heat away from the vapor. The refrigerant 14 cools to the condensation temperature, releasing its heat as condensation, and changing phase back to a hot liquid, still at a high pressure. The refrigerant 14 completes the cycle by passing through a thermostatic expansion valve 26, which meters the high pressure liquid refrigerant 14 as a low pressure spray into the evaporator 12.

The refrigerant 14, such as R-134a or more recent variations thereof, circulates under pressure in the air conditioning/refrigeration system. In each cycle, the refrigerant 14 is caused to change phase from liquid to gas and back to liquid, absorbing heat from the passenger compartment 16 and releasing heat outside the compartment.

In some systems it is necessary to store the liquid refrigerant in a reservoir before it is metered through the expansion valve 26 because the demand of the evaporator 12 varies under differing conditions. In other systems it is a practice to install an accumulator (not shown) between the evaporator 12 and compressor 20 so that no liquid can enter the compressor 20. In either system, water contamination in the refrigerant 14 can cause the water vapor to freeze at the point of expansion, causing refrigerant flow to be blocked, and to react with refrigerants to form acids that may cause internal damage to metal parts. To prevent that from occurring, a receiver-dehydrator 30, also referred to as receiver-drier, is located between the condenser 22 and the evaporator 12 to remove moisture from the refrigerant. In other air conditioner systems, an accumulator-dehydrator may be located between the evaporator 12 and compressor 20 to accumulate the refrigerant vapor and remove moisture from it. Various tubes (28A, 28B, 28C) connect the components for channeling refrigerant.

As shown in FIG. 3, the receiver-dehydrator 30 includes a housing 31 inside of which is typically a filter 32 and a desiccant bag 34. Inside the desiccant bag 34 is plurality of desiccant material 36, generally in the shape of beads for removing moisture from the refrigerant 14. In conventional systems, a fluorescent dye-laden wafer 40 is located in or downstream from the desiccant bag.

As shown in FIG. 1, the air conditioning system 10 is a closed-loop system and, as such, only after the components are all installed into the automobile can refrigerant be added to the system. However, prior to adding refrigerant, the system 10 is evacuated to remove air and moisture. Since the system is evacuated prior to the addition of refrigerant, it is difficult to add dye to the system after assembly. As such, the present invention contemplates adding a dye coating to components in the system or injecting a liquefied dye into a component of the system and permitting it to resolidify prior to attachment of the component to the system.

The present invention contemplates a new solid fluorescent dye which is configured to have a melting temperature at a predetermined level above ambient temperature for turning the solid dye into a liquid phase for application into A/C components and that resolidifies prior to use. In one preferred embodiment, the solid fluorescent dye is configured to melt between 45-60° C., and more preferably between 50-55° C. The present invention also contemplates a method for using the new solid dye. By configuring the dye to melt into a liquid state at a temperature above ambient and which resolidifies when the temperature above ambient is reduced OEMs or suppliers can apply or introduce the dye into components of the system prior to assembly of the A/C system. The melted/liquid dye would be introduced into the air conditioning component and then change phase back into a solid, remaining in position until a flow of solvent (e.g. liquid refrigerant or oil) passes around or through the resolidified dye causing it to dissolve and be carried throughout a system.

In addition, the invention contemplates placing the liquefied or flowable dye into a component on the high temperature side of the system. As such, when the system is started, the high temperature causes the solid dye to quickly change again to its liquid state and then dissolve into the solvent. A liquid dye will more quickly dissolve into a solvent and disperse through the system than a solid dye. This can save considerable time at the initial testing stage thereby providing a tremendous advantage to an OEM manufacturer or a repair center.

In addition, since the dye can be quickly changed to a liquid form, it permits the dye to be introduced into components of the system through which solids do not normally flow, such as a compressor (where hot oil and gas pass through).

The dye could be applied to an air conditioning component by a supplier (or an OEM), such as manufacturers of conventional desiccant bags, filters, coils, or hoses. Some of the high temperature components where the dye can be introduced include (i) the tube from the compressor to the condenser, (ii) the header of the condenser, (iii) the exit port of the condenser (in the case of R-134a or R-1234yf, currently the most common automotive refrigerants, the warm liquid refrigerant is approximately 40° C.), or (iv) receiver/desiccant bag (such as the desiccant beads in the receiver-dehydrator or placed into the inlet).

In some automotive AC systems a muffler is added in the discharge line right after the compressor. The muffler acts as a noise dampener and reduces the pressure surges going into the condenser. If a muffler is included in the AC system the dye could be included in any convenient part of the muffler. Also, for AC designs systems that include orifice tubes before the evaporator for metering between the high and low pressure sides. The dye could be placed in the orifice tube.

The dye is preferably configured to initially be in a solid state in its initial form in ambient or room temperature and structured so as to melt when exposed to an elevated temperature above ambient (or at least soften sufficiently to be flowable or moldable, then resolidify when the temperature is reduced to ambient or room temperature. Thereafter, during use with a refrigerant, the resolidified dye is configured to dissolve into and mix with the refrigerant. In one embodiment, the volume of dye introduced in the component is such that when in use where it mixes with the refrigerant, its volume is about 0.08% of the system's oil charge.

In its original solid form, the dye can be supplied as loose powder or shaped into a convenient form (e.g., block or cylindrical rod). The user (supplier/OEM) would use a device to melt the dye into its liquid state and which permits the liquid to be easily dispensed (e.g., through a spray or nozzle). The supplier applies or dispenses the liquified dye to the supplier's product (e.g., the air conditioning component) where the dye re-solidifies inside the product (such as on an interior surface) and remains safely in place until the product is shipped to the HVAC or A/C system manufacturer or assembler (e.g., the OEM). The manufacturer/assembler adds the component to the HVAC or A/C system as part of its normal assembly process. When the OEM charges the system with refrigerant, the resolidified dye both melts and dissolves into the refrigerant and circulates though the system.

It is contemplated that the heating device used by the supplier to liquefy the dye would be designed to add or introduce a specific amount of the melted dye into the interior of various components, such as coils, tubes, receivers, compressors or hoses. It is also contemplated that the melted dye could be applied as an aerosol into the component, coating a portion of the sides of the component.

One of the key benefits of the present invention is that the dye can be positioned almost anywhere within a system, allowing for the selection of the location in the system that permits quicker dissolving of the dye into solution, thereby expediting the ability to conduct fluorescent testing. In addition, as mentioned above, conventional systems require the use of a carrier such as a felt matrix. The present invention eliminates the need for felt or any other carrier. This invention also allows for more reliable assembly-line use of dyes as a leak detection QC tool, while maintaining the effectiveness later on in the field for service or dealer prep. The invention also permits use in aftermarket products. For example, replacement hoses for an A/C system can be coated with the dye, thus permitting repair shops to quickly introduce fluorescent dye into a repaired A/C system.

The present invention also contemplates a method of introducing the dye that includes the steps of (i) providing a dye that is solid at room temperature, (ii) exposing the dye to an elevated temperature to melt the dye into a liquid or flowable state, (iii) injecting, channeling, spraying or placing the flowable dye into a component, (iv) allowing the dye to resolidify in the component, (v) attaching the component to an HVAC or A/C system, and (iv) both melting and dissolving the resolidified dye in a liquid/gas.

An embodiment of the invention is depicted in FIGS. 4A and 4B where the dye 50 is applied to a component 52 of the air conditioning system, such as the hoses 28A, 28B, 28C (preferably tube 28C from the compressor to the condenser), the header of the condenser, or the exit port of the condenser. In this embodiment, a spray system 54 with a spray head 56 is connected to a supply of meltable dye. The dye is heated above its melting temperature and the liquefied dye is supplied to the spray head 56. A desired volume of liquefied dye is sprayed into the component 52 to form a desired coating 50 of the dye. Once a sufficient amount of liquefied dye is applied to the component, the dye coating in coated component is allowed to solidify. It can then be supplied to the OEM (or the aftermarket repair service) for attachment to the air conditioning system.

As should be apparent, during initial operation of the air conditioning system, after charging with refrigerant, as warm refrigerant enters the component 52, it will cause the dye coating 50 on the component 52 to dissolve and intermix with the refrigerant. The dissolving will be accelerated as the dye quickly warms and reaches its melting point and changes phase to a liquid. It is expected that the dye should be sufficiently intermixed within several minutes thus allowing for the present invention to permit inspection for leaks by the OEMs or service personnel of the air conditioning system shortly after assembly.

An embodiment of the invention is depicted in FIGS. 5A and 5B where the dye 100 is applied to a plurality of desiccant beads 102 in a receiver-dehydrator that is or will be installed into an air conditioning system. Desiccant beads in an air conditioning desiccant bag are generally made from molecular sieve which is designed to minimize decomposure of refrigerants, has a high water capacity under charging temperature and pressure, tends to prevent the release of moisture back into the system and does not readily adsorb refrigerant or oil. The bead material may be any common desiccant absorbent, such as zeolites. In the present invention, before adding the desiccant beads to the bag, a coating of the melted dye is applied to a plurality of the beads 102 (FIG. 5A) resulting in coated beads 102 (FIG. 5B). While it is preferred that the coating be uniform, it is sufficient that the total volume of the meted dye that is applied to the beads is sufficient to yield the desired amount of dye in the refrigerant during operation of the air conditioning system.

As should be apparent, during initial operation of the air conditioning system, after charging with refrigerant, as warm refrigerant enters the desiccant bag, it will cause the dye coatings 100 on the desiccant beads 102 to dissolve and intermix with the refrigerant as a function of both the solvency of the refrigerant stream and the dye melting at the refrigerant operating temperatures. It is expected that the dye should be sufficiently intermixed within several minutes thus allowing for the present invention to permit inspection by the OEMs of the air conditioning system for leaks shortly after assembly.

One embodiment for coating the beads 36 is as follows. Conventional desiccant beads are placed in a tray. A spray system 104 with a spray head 106 is connected to a supply of meltable dye. The dye is heated above its melting temperature and the melted dye is supplied to the spray head 106. A volume of liquefied dye is sprayed onto the beads. A tumbling process may be incorporated to provide better surface coating of the beads. A tumbling process uses a coating pan to assist in the coating process. Coating pans used in other conventional coating processes, such as candy coating, have ball or cylinder shapes to facilitate tumbling of component being coated in order better coat the sides and bottom of the component. Once a sufficient amount of liquefied dye is applied to the beads, the coated beads are cooled, preferably with dry air. The coated beads are then added to the desiccant bag.

In another embodiment, the liquefied dye is injected directly into the desiccant bag or a dissolvable volume of the dye is placed in the desiccant bag prior to installation.

A variety of well-known dispensers exist that can be used in the present invention as part of the spray or dispensing system. The dispensers include heated or warmed dispensing tubes that receive a supply of melted dye and maintain the dye in its liquefied state until dispensed.

In an embodiment, the dye is a formulation of the SME-53 dye disclosed in U.S. Pat. No. 9,845,390, which is incorporated herein by reference in its entirety. The dye is adjusted to stay in solid form to a temperature above ambient, preferably around 40° C. at which point the dye melts into a liquid. Specifically, the alkyl chain length of the ester moieties were reduced sequentially to allow for appropriate crystallization. Reduction to a carbon chain length of 12-14 results in the formation of a waxy solid with melting points within the desirable range. The following depicts the formula for a first preferred embodiment of the dye formulation according to the present invention:

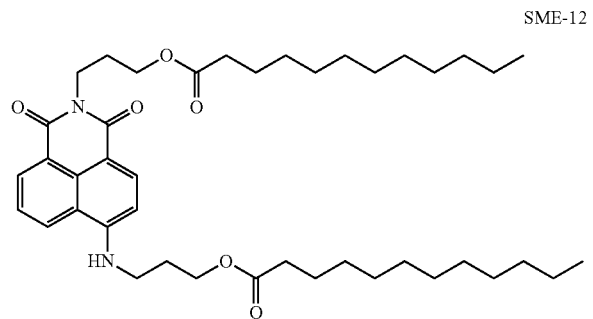 [SMILES: CCCCCCCCCCCC(=O)OCCCNc1ccc2c3c(cccc13)C(=O)N(CCCOC(=O)CCCCCCCCCCC)C2=O]

SME-12

The following depicts the formula for a second preferred embodiment of the dye formulation according to the present invention:

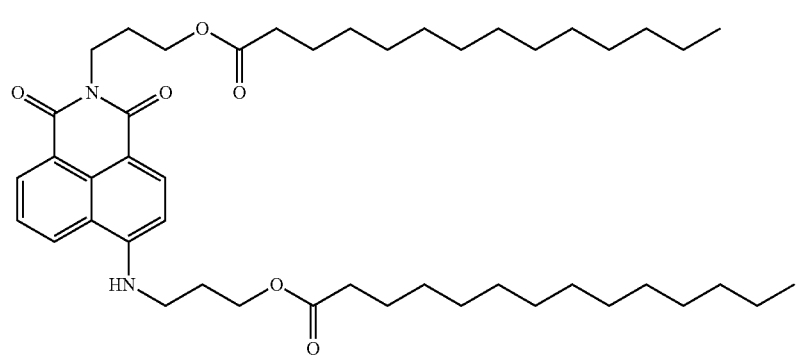

SME-14

Testing has shown that longer alkyl chain lengths remained as viscous oils at room temperature, thus not providing a suitable solid.

As used herein, the term "engage" is intended to both direct physical engagement through one or more components as well as operative engagement.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed. The various embodiments and elements can be interchanged or combined in any suitable manner as necessary.

The use of directions, such as forward, rearward, top and bottom, upper and lower are with reference to the embodiments shown in the drawings and, thus, should not be taken as restrictive. Reversing or flipping the embodiments in the drawings would, of course, result in consistent reversal or flipping of the terminology.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalent.

The invention claimed is:

1. A process for applying a fluorescent leak detection dye to a component of an air conditioning or refrigeration system comprising the steps of:
   (i) providing a fluorescent dye that is solid at room temperature and has a melt temperature between 40° C.-70° C., wherein the dye comprises:

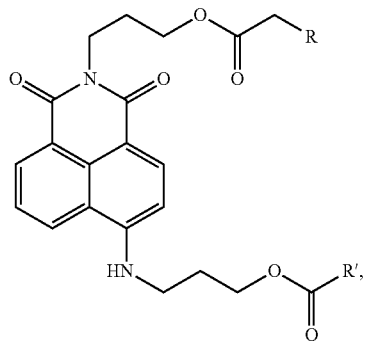

where R and R' are carbon chains with lengths between 9 and 15;
   (ii) exposing the dye to an elevated temperature above its melting point and less than 70° C. to melt the dye into a flowable state so as to produce a flowable dye;
   (iii) injecting, channeling, spraying or placing the flowable dye into or on a component of an HVAC, A/C or refrigeration system; and
   (iv) allowing the dye to resolidify in or on the component;
   (v) attaching the component with the resolidified dye to the HVAC, A/C or refrigeration system; and
   (iv) exposing the resolidified dye to a liquid/gas to cause the resolidified dye to dissolve.

2. The process of claim 1 wherein step of exposing the resolidified dye to a liquid/gas involves allowing the resolidified dye to change to a liquid state and dissolving the liquid dye into the liquid/gas lessening the time required for the dye to dispense into the liquid/gas than required to dissolve a dye in its solid state.

3. The process of claim 1 wherein the component is a plurality of desiccant beads for a desiccant bag in a receiver-dehydrator and wherein the step of injecting, channeling, spraying or placing the flowable dye involves spraying or dispensing a flow of the liquefied dye onto the desiccant beads to form coated desiccant beads, and wherein after the step of allowing the dye to resolidify the process involves the step of adding the plurality of coated desiccant beads to the desiccant bag and attaching the desiccant bag to the receiver-dehydrator.

4. The process of claim 3 wherein prior to the step of spraying or dispensing a flow of the liquefied dye onto the desiccant beads the process involves placing a plurality of desiccant beads in a tray, and wherein the step of spraying or dispensing a flow of the liquefied dye onto the desiccant beads involves channeling the liquefied dye to a spray head to dispense a volume of the liquefied dye onto the beads as that beads are tumbled in the tray.

5. The process of claim 1 wherein the component is a hose for an air conditioning system, and wherein the step of injecting, channeling, spraying or placing the flowable dye involves spraying or dispensing a flow of the flowable dye into the inside of the hose to form a coating.

6. The process of claim 5 wherein the step of attaching the component with the resolidified dye to the HVAC, A/C or refrigeration system involves attaching the hose with the coating to the air conditioning system.

7. The process of claim 1 wherein the component is a condenser for an air conditioning system, and wherein the step of injecting, channeling, spraying or placing the flowable dye involves spraying or dispensing a flow of the flowable dye into a port or an integral component on the condenser, and wherein the step of attaching the component with the resolidified dye to the HVAC, A/C or refrigeration system involves attaching the condenser with the coating to the air conditioning system.

8. The process of claim 1 wherein the component is a receiver-dehydrator for an air conditioning system, and wherein the step of injecting, channeling, spraying or placing the flowable dye involves spraying or dispensing a flow of the flowable dye into a port or component on the receiver-dehydrator or on an internal component thereof, and wherein the step of attaching the component with the resolidified dye to the HVAC, A/C or refrigeration system involves attaching the receiver-dehydrator with the resolidified dye to the air conditioning system.

9. The process of claim 1 wherein the component is a thermostatic expansion valve for an air conditioning system, and wherein the step of injecting, channeling, spraying or placing the flowable dye involves injecting, channeling, spraying or placing a flow of the flowable dye into an inlet or outlet of the thermostatic expansion valve, and wherein the step of attaching the component with the resolidified dye to the HVAC, A/C or refrigeration system involves attaching the thermostatic expansion valve with the resolidified dye to the air conditioning system.

10. The process of claim 1 further comprising the steps of:
    packaging a plurality of the components that include the resolidified dye; and
    shipping the packaged components to a manufacturer for assembly in HVAC, A/C or refrigeration systems.

11. The process of claim 1, wherein the fluorescent dye that is solid at room temperature and has a melt temperature between 45° C.-65° C. and wherein the dye is selected from a group consisting of:

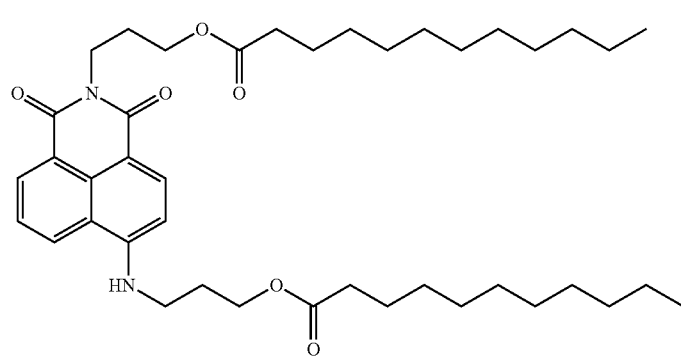

(a)

and

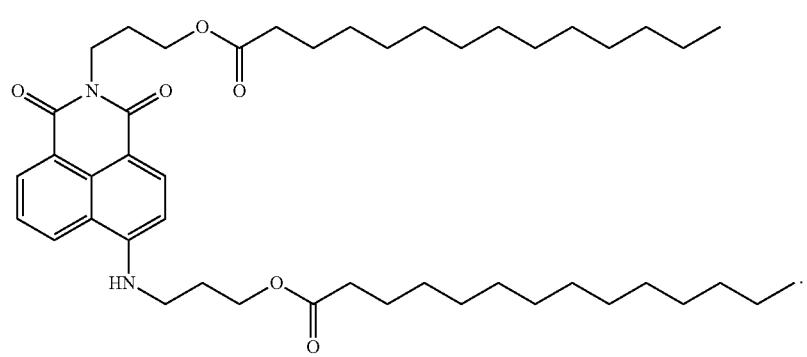
(b)
\* \* \* \* \*